April 23, 1929. W. H. NOELTING 1,710,105
SOCKET AND CASTER
Filed May 28, 1927  2 Sheets-Sheet 2
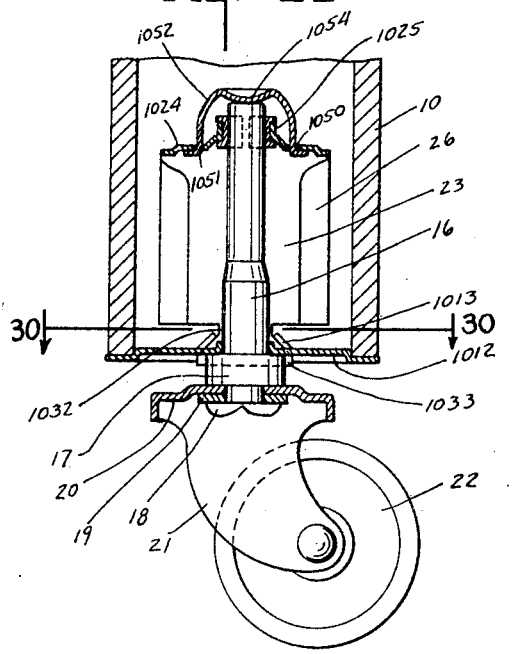
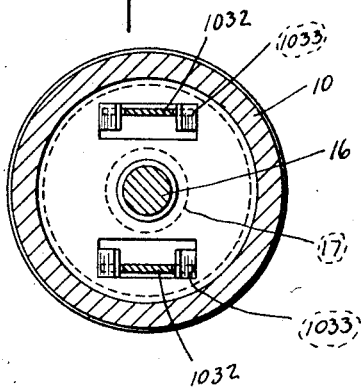
INVENTOR.
WILLIAM H. NOELTING.
BY
ATTORNEYS.

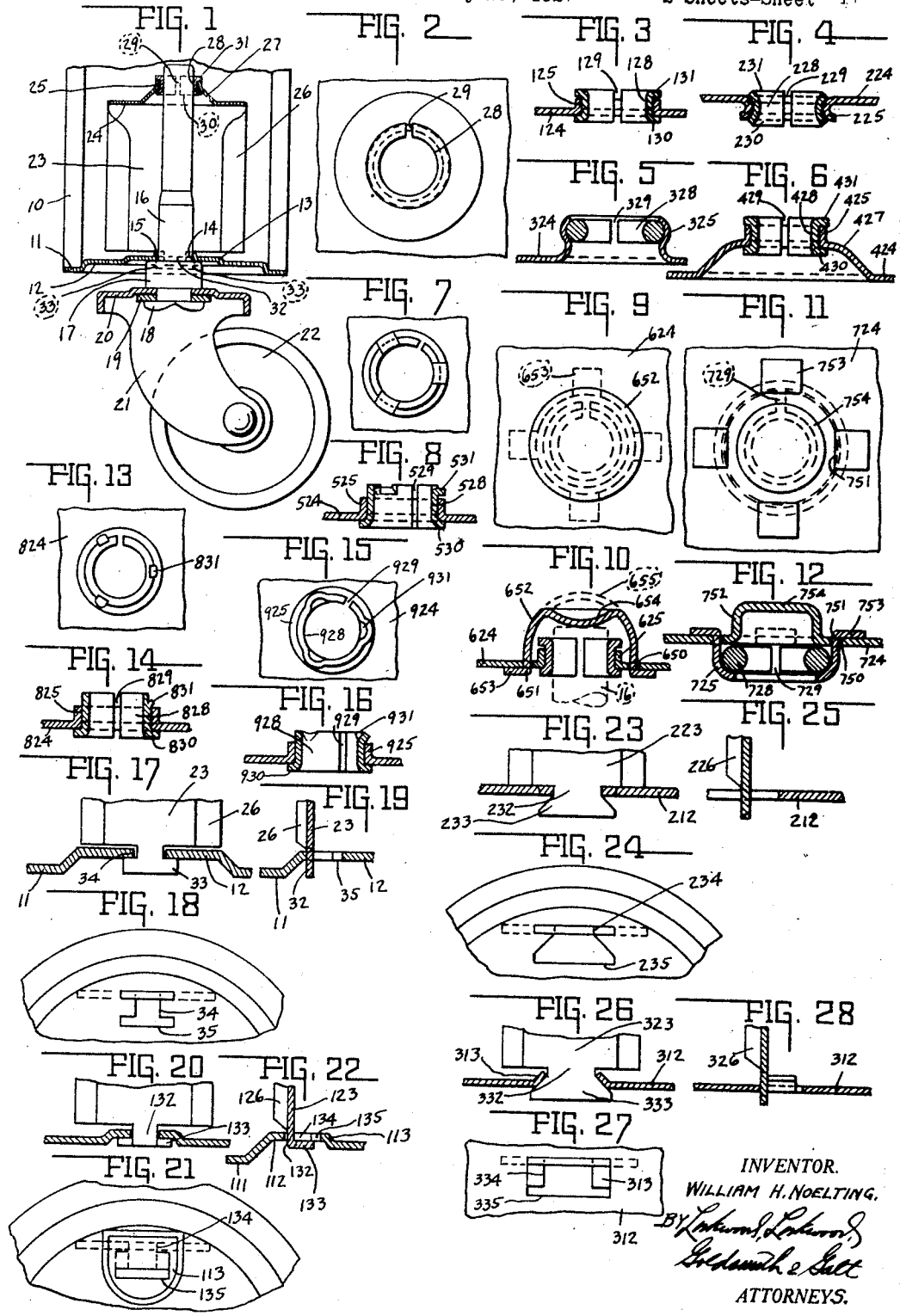

Patented Apr. 23, 1929.

1,710,105

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

SOCKET AND CASTER.

Application filed May 28, 1927. Serial No. 195,033.

This invention relates to a detachable caster and socket wherein the caster stem requires substantially little or no machining.

The chief object of the invention is to provide a detachable caster and socket construction which will permit the use of a caster stem requiring little or no machining and which will be frictionally retained by the socket by means wherein minimum wear will occur between the retaining parts and wherein the side strain between the socket and the stem will be reduced to a minimum at the frictional engaging portions thereof.

The chief feature of the invention consists in the peculiar construction of the socket which is adapted to receive a full fit stem and frictionally retain the same in load supporting position with a minimum of wear and side strain.

The structural arrangement comprises essentially a caster with a stem substantially full fit or non-machined, and a caster socket detachably mounting the same including a centrally apertured load supporting plate, the central aperture receiving the caster stem and a spring frame centering and retaining construction which is anchored to the plate for supporting the same upon the load and for frictionally and centeringly sustaining the upper portion of the caster stem.

The full nature of the invention will be understood from the accompanying drawings and the following description and claims:

In the drawings Fig. 1 is a central sectional view of a tubular leg with the caster construction including the invention mounted thereon. Fig. 2 is an enlarged top plan view of a portion of the combination stem centering and friction retaining frame. Fig. 3 is a central transverse section of a modified form of stem centering and retaining construction. Fig. 4 is a similar view of another modified form thereof. Fig. 5 is a view of a still further modified form. Fig. 6 is a similar view of a still further modified form and is very similar to that shown in Fig. 1. Fig. 7 is a top plan view and Fig. 8 is a central section of a modified form of stem centering and retaining construction. Fig. 9 is a top plan view and Fig. 10 is a central section of a further modified form of stem centering and retaining construction showing an extension comprising a top bearing. Fig. 11 is a top plan view and Fig. 12 is a central sectional view of a modified form of top bearing construction including the invention. Fig. 13 is a top plan view and Fig. 14 is a central section of another modified form of stem centering and retaining construction. Fig. 15 is a top plan view and Fig. 16 is a central section of a still further modified form of stem centering and retaining construction. Fig. 17 is a sectional view taken in the plane of the load engaging spring frame and showing the anchorage of the same to the load supporting plate. Fig. 18 is a top plan view thereof. Fig. 19 is a view taken at right angles to Fig. 17. Figs. 20, 21 and 22 are figures similar to Figs. 17, 18 and 19, respectively, but of a modified form of spring frame and plate anchorage. Figs. 23, 24 and 25 are views similar to the aforesaid respectively, and of a still further modified form of spring frame and plate anchorage. Figs. 26, 27 and 28 are similar figures respectively, of a still further modified form of spring frame and plate anchorage.

Fig. 29 is a view similar to Fig. 1 of a modified form of the invention and that form upon which all the claims read. Fig. 30 is a sectional view taken on line 30—30 of Fig. 29 and in the direction of the arrows.

In the drawings 10 indicates a tubular leg of a load supported by a flange or ledge 11 of a plate 12 having a central embossment 13 provided with a central aperture 14 defined by an upstanding neck or collar 15. The central aperture receives a stem 16 which, by means of the enlargements 17 and 18 and through the medium of the washer 19, is rigidly supported by a caster yoke having the plate portion 20 and the ears 21 which in turn pivotally support the roller 22. In all forms of the invention, except those in which a top bearing is provided as illustrated in Figs. 9 to 12 inclusive to which reference will be had more in detail later, the enlargement 17 bears on the embossment 13 or the plate and carries the load.

The stem retainer and anchorage for the plate comprises a substantially U-shaped spring frame having a pair of arms 23 connected by a transverse or flat arch portion 24 which is centrally apertured as at 25. Herein each spring arm 23 is shown provided with radially flared edges 26, and in Fig. 1 the transverse portion 24 is shown provided with a cup formation 27 between the centrally apertured neck 25 and the main body portion of the transverse connection. Rotatably mounted in the central aperture is a friction ring or ferrule 28 having the parting 29 and a lower peripheral flange 30 and an upper peripheral flange 31 form a channel by which the friction ring construction is rotatably mounted in the spring frame. The caster stem 16 extends through the friction ring and is gripped thereby and retained against axial or longitudinal displacement from the socket. The friction ring is of such construction that it will swivelably support the spring frame relative to the caster stem or vice versa. The spring frame arms are seatable in the tubular leg and the radially flared edges 26 thereof linearly engage the leg at four diametrically opposite points, thus centering the spring frame within the leg and consequently the caster with respect to the leg. The spring frame is detachably anchored to the plate by having an irregular shaped extension or anchorage portion 32 with lateral extending portions 33, the same being receivable by a T-shaped slot 34 having the receiving or head portion 35 formed in the plate 12. The normal tendency of the spring frame is to expand the two arms in separated relation and thus the spring frame is automatically self-locking to and upon the plate.

One such type of anchorage is shown in detail in Figs. 17 to 19, inclusive, but for the same any one of the types of anchorages shown in Figs. 20 to 28 may be substituted, and herein a modified form shown in Figs. 20 to 22 is designated by the numerals of the 100 series that in Figs. 23 to 25 inclusive, by the 200 series, and that shown in Figs. 26 to 28 by the 300 series. In Figs. 20 to 22 inclusive, the anchorage portion 133 extends inwardly and angularly of the neck portion 132 and the same is positionable in an embossed portion 113 formed in the plate adjacent the opening 134 and 135.

In Figs. 23 to 25 inclusive, plate 212 is shown provided with a wedge-shaped slot 235 including the neck 234 for receiving a wedge-shaped anchorage having the anchoring end 233 and the neck 232 carried by the spring frame 223, as shown. Plate 212 is herein shown flat.

In Figs. 26 to 28, inclusive, plate 312 is shown flared as at 313 adjacent the openings having the enlarged portion 335 and the neck 334. 313 illustrates the embossed portion which is associated with the wedge-shaped anchorage 333 having the neck 332, as shown.

Several different modified forms of stem centering constructions and friction retaining constructions are shown in Figs. 3 to 16 inclusive, and of these figures, Figs. 9 to 12 show a top bearing construction in addition.

In Fig. 3 the transverse or flat arch portion of the spring frame is indicated by the numeral 124 and the central aperture is defined by the collar portion 125. The friction ferrule or split ring includes the lower flange 130 and the upper flange 131 forming the channel by means of which the body portion 128 is retained in the central aperture, said ring or friction band having the slot 129 or split portion.

In Fig. 4 the transverse portion 224 has the central aperture defined by a curled or beaded portion 225 which herein is shown extending downwardly and the friction ring mounted therein has the lower outwardly flared portion 230 and the upper outwardly flared portion 231 forming a seating groove with the intermediate connecting portion 228, said ring also having the split or parting 229.

In Fig. 5 the transverse portion of the spring frame 324 includes the arcuately grooved collar 325 which receives the split ring 328 having the parting 329 therein. The upper and lower curved surfaces of this ring, which is herein shown circular in section, engage in the groove formed in the drawn neck portion 325 and seat therein.

In Fig. 6 the transverse strap portion 424 is shown flared upwardly as at 427 and the central aperture is defined by the collar 425, the latter being seatable in the groove formed in the friction ring by the stem engaging body portion 428 and the upper and lower outwardly directed flange portions 431 and 430 respectively, said friction ring being split at 429.

Figs. 7 and 8 are similar to the construction shown in Fig. 3, in that the collar 525 defining the central aperture in the transverse portion 524 of the spring frame supports a split friction ring or band having the split portion 529, the body portion 528 and the lower outwardly directed flange 530. In place of a complete peripheral flange in the upper portion of the friction band certain portions thereof are flared outwardly as indicated at 531 and form retaining portions for retaining the friction ring in position. The retaining portions are formed by longitudinally slitting the body 528 and forcing outwardly said retaining portions.

Figs. 13 and 14 show a somewhat similar construction in which the transverse portion 824 has the aperture defined by the collar 825 in which is mounted a split friction ring 828 having a lower retaining flange 830, the split portion 829 and herein the retaining portions 831 are struck from the body portion in the form of a lug 831 which does not deform the interior of the friction band thereby providing full cylindrical stem contact.

In Figs. 15 and 16 a somewhat modified form of the invention is illustrated and this form is a variation between that shown in Figs. 7 and 8 and Figs. 13 and 14. Herein the transverse portion of the spring frame 924 has a central aperture defined by the collar 925 which supports the ring 928 having the lower retaining flange 930 and a plurality of integral outwardly struck anchorages or lugs 931. The ring has the usual split portion 929.

Figs. 9 to 12 inclusive, show an extension of the foregoing variations of stem retainers and mountings therefor, and in Figs. 9 and 10, 624 indicates the transverse portion of the U-shaped spring frame, the central aperture of which is defined by the collar 625. Herein said transverse portion is shown provided with four diametrically positioned openings 650 through which extend tongues 651 of a top bearing arrangement 652, said tongues being turned angularly and outwardly as at 653. The top bearing cap may have a convex curvature as indicated at 654 or may have that, as illustrated by the dotted lines and indicated by the numeral 655, the former being preferred for a substantially flat headed stem illustrated by dotted lines in Fig. 10 and indicated by the numeral 16.

In Figs. 11 and 12 there is illustrated a variation of the foregoing top bearing construction and in this form the U-shaped spring frame mid-portion 724 is apertured as at 750 to receive tongues 751 turned angularly and outwardly as at 753, said tongues retaining in position a collar 725 having a central stem receiving aperture. In this form of the invention the transverse portion of the strap 724 is not apertured but is deformed as at 752 to form a closed top bearing 754. Interposed between the strap and the collar portion 725 and very similar to that shown in Fig. 5, is a friction ring circular in cross section and having upper and lower curved surfaces engageable by said parts for retaining said ring 728 in position to frictionally engage the stem, said ring having the split portion 729.

For the purpose of election upon which all the claims shall read, it is to be understood that Fig. 1 is illustrative of the combination and that the elected specific construction includes a spring frame having an anchorage of the character shown in Figs. 26 to 28 inclusive, to wit, the spring frame includes a neck and an enlarged extension beyond the same and the plate to which said frame is anchored includes a T-shaped slot or its equivalent, having portions surrounding the same suitably offset, for example, angularly of the plate as shown in Figs. 26 to 28 inclusive, or fully offset as shown in Figs. 20 to 22 inclusive, the former being the most specific form. The spring frame in the elected specified form of the invention on which all the claims read includes the top bearing construction and the friction ring supported in spaced relation by the transverse or flat arch portion of the U-shaped frame and in spaced relation, the preferred construction being shown specifically in Figs. 9 to 12 inclusive, with the elected most specific form being shown particularly in Figs. 9 and 10. Therefore, the most specific form of the invention includes the combination as disclosed in Fig. 1 with a top bearing of the character shown in Figs. 9 and 10 and a spring frame anchorage as shown in Figs. 26 to 28 inclusive. In the drawings Figs. 29 and 30 illustrate the above and in said figures the similar parts bear similar numerals of the 1000 series.

While many modifications of the invention have been illustrated in the drawings and described in great detail, the same and others which will readily suggest themselves to those skilled in the art, it is to be understood, are all included within the scope of this invention, reference being had to the appended claims.

The invention claimed is:

1. A detachable caster construction including a caster with a stem, and a load supporting spring frame socket detachably receiving and swivelably supporting said stem and comprising a stem-receiving apertured plate, an inverted U-shaped spring frame having the lower ends of its arms movably anchored to the plate, and a friction ring in alignment with the plate aperture and supported by the spring frame mid-portion for frictionally securing the stem thereto and for confining the lateral movement thereof, the free end of the stem being no greater in cross sectional area than the plate aperture for socket reception and detachment.

2. A detachable caster construction including a caster with a stem and a load supporting spring frame socket detachably receiving and swivelably supporting said stem and comprising a stem-receiving apertured plate, an inverted U-shaped spring frame having the lower ends of its arms anchored to the plate, a friction ring in alignment with the plate aperture and supported by the spring frame mid-portion for frictionally securing the stem thereto and for confining the lateral movement thereof, the free end of the stem being no greater in cross sectional area than the plate aperture for socket reception and detachment, said spring frame including at its mid-portion a central aperture through which the stem projects when seated, and means carried by the ring supporting portion of the frame and positionable upon the opposite side of said ring from said plate for limiting the seating movement of the stem relative thereto.

3. A detachable caster construction including a caster with a stem, and a load supporting spring frame socket detachably receiving and swivelably supporting said stem and comprising a stem-receiving apertured plate, an inverted U-shaped spring frame having the lower ends of its arms movably anchored to the plate, and a friction ring in alignment with the plate aperture and supported by the spring frame mid-portion for frictionally securing the stem thereto and for confining the lateral movement thereof, the free end of the stem being no greater in cross sectional area than the plate aperture for socket reception and detachment, said friction ring being split and normally of less diameter than the stem received thereby and of an external diameter when fully expanded by said stem substantially less than the frame supporting portion whereby stem expansion is insufficient to lock the ring in said frame and thereby permitting free swiveling of the ring in the U-shaped frame when swiveled by and with the caster stem.

4. A detachable caster construction including a caster with a stem and a load supporting spring frame socket detachably receiving and swivelably supporting said stem and comprising a stem-receiving apertured plate, an inverted U-shaped spring frame having the lower ends of its arms anchored to the plate, a friction ring in alignment with the plate aperture and supported by the spring frame mid-portion for frictionally securing the stem thereto and for confining the lateral movement thereof, the free end of the stem being no greater in cross sectional area than the plate aperture for socket reception and detachment, said spring frame and plate anchorage including a complementary detachable tongue and slot connection, the tongue having a neck and enlarged head portion and the slot having similar portions, the plate portion adjacent the slot being deformed and conforming to the anchoring tongue to receive and nest the same, said plate deformed portion being inclined to said plate, said tongue including an inclined wedging surface for engagement therewith.

5. A detachable caster construction including a caster with a stem and a load supporting spring frame socket detachably receiving and swivelably supporting said stem and comprising a stem-receiving apertured plate, an inverted U-shaped spring frame having the lower ends of its arms anchored to the plate, a friction ring in alignment with the plate aperture and supported by the spring frame mid-portion for frictionally securing the stem thereto and for confining the lateral movement thereof, the free end of the stem being no greater in cross sectional area than the plate aperture for socket reception and detachment, said friction ring having an intermediate tubular body portion for stem reception, said body portion being split for expansion and contraction, and outwardly directed upper and lower anchoring portions upon said ring and in spaced relation for embracing the mid-portion of the spring frame supporting said ring.

6. A detachable caster construction including a caster with a stem and a load supporting spring frame socket detachably receiving and swivelably supporting said stem and comprising a stem-receiving apertured plate, an inverted U-shaped spring frame having the lower ends of its arms anchored to the plate, a friction ring in alignment with the plate aperture and supported by the spring frame mid-portion for frictionally securing the stem thereto and for confining the lateral movement thereof, the free end of the stem being no greater in cross sectional area than the plate aperture for socket reception and detachment, said friction ring having an intermediate tubular body portion for stem reception, and being split for expansion and contraction, and outwardly directed upper and lower anchoring portions upon said ring and in spaced relation for embracing the mid-portion of the spring frame supporting said ring, said lower outwardly directed portion having a flared interior for stem guidance.

7. A detachable caster construction including a caster with a stem, and a load sustaining spring frame socket detachably receiving and swivelably supporting said stem and comprising a stem-receiving apertured plate, an inverted U-shaped spring frame having the ends of its arms secured to said plate and its mid-portion provided with a stem-receiving aperture including a drawn collar defining the same, and a metal band swivelably mounted within said collar, said band and said collar having complementary portions preventing axial separation, said stem being axially receivable by said band and frictionally retained in the socket thereby.

8. A detachable caster construction including a caster with a stem, and a load sustaining spring frame socket detachably receiving and swivelably supporting said stem and comprising a stem receiving apertured plate, an inverted U-shaped frame having the ends of its arms secured to said plate and its mid-portion provided with a stem-receiving aperture including a collar defining the same, a metal band swivelably mounted within said collar, said band and said collar having complementary portions preventing axial separation, said stem being axially receivable by said band and frictionally retained in the socket thereby, said spring frame including a central aperture through which the stem projects when seated, and means carried by the band supporting portion of the frame and positionable upon the opposite side of said band from said plate for limiting the seating movement of the stem relative thereto.

9. A detachable caster construction including a caster with a stem, and a load sustaining spring frame socket detachably receiving and swivelably supporting said stem and comprising a stem-receiving apertured plate, an inverted U-shaped spring frame having the ends of its arms secured to said plate and its mid-portion provided with a stem-receiving aperture including a drawn collar defining the same, and a metal band swivelably mounted within said collar, said band and said collar having complementary portions preventing axial separation, said stem being axially receivable by said band and frictionally retained in the socket thereby, said friction ring being split and normally of less diameter than the stem received thereby and of an external diameter when fully expanded by said stem substantially less than the frame supporting portion whereby stem expansion is insufficient to lock the ring in said frame and thereby permitting free swiveling of the ring in the U-shaped frame when swiveled by and with the caster stem.

10. A detachable caster construction including a caster with a stem, and a load sustaining spring frame socket detachably receiving and swivelably supporting said stem and comprising a stem receiving apertured plate, an inverted U-shaped frame having the ends of its arms secured to said plate and its mid-portion provided with a stem-receiving aperture including a collar defining the same, a metal band swivelably mounted within said collar, said band and said collar having complementary portions preventing axial separation, said stem being axially receivable by said band and frictionally retained in the socket thereby, said spring frame and plate anchorage including a complementary detachable tongue and slot connection, the tongue having a neck and enlarged head portion and the slot having similar portions, the plate portion adjacent the slot being deformed and conforming to the anchoring tongue to receive and nest the same, the deformed plate portion being inclined to said plate, and a wedging surface on said anchoring tongue for engagement with the plate deformed portion.

In witness whereof, I have hereunto affixed my signature.

WILLIAM H. NOELTING.